(12) United States Patent
Rashid et al.

(10) Patent No.: US 9,706,336 B2
(45) Date of Patent: Jul. 11, 2017

(54) EFFICIENT COORDINATION BETWEEN A 3GPP NODE AND MTC DEVICES FOR COVERAGE ENHANCEMENT MODE

(71) Applicant: Intel Corporation, Santa Clara, CA (US)

(72) Inventors: Mohammad Mamunur Rashid, Hillsboro, OR (US); Maruti Gupta, Portland, OR (US); Satish C. Jha, Hillsboro, OR (US); Rath Vannithamby, Portland, OR (US); Ali T. Koc, Portland, OR (US); Kathiravetpillai Sivanesan, Richardson, TX (US)

(73) Assignee: INTEL CORPORATION, Santa Clara, CA (US)

( * ) Notice: Subject to any disclaimer, the term of this patent is extended or adjusted under 35 U.S.C. 154(b) by 172 days.

(21) Appl. No.: 14/582,540

(22) Filed: Dec. 24, 2014

(65) Prior Publication Data

US 2015/0264511 A1   Sep. 17, 2015

Related U.S. Application Data

(60) Provisional application No. 61/953,646, filed on Mar. 14, 2014.

(51) Int. Cl.
*H04W 4/00* (2009.01)
*H04W 48/12* (2009.01)

(52) U.S. Cl.
CPC ........... *H04W 4/005* (2013.01); *H04W 48/12* (2013.01)

(58) Field of Classification Search
CPC .............................. H04W 48/12; H04W 4/005
See application file for complete search history.

(56) References Cited

U.S. PATENT DOCUMENTS

| | | | |
|---|---|---|---|
| 2013/0294399 A1 | 11/2013 | Lee | |
| 2013/0301524 A1 | 11/2013 | Xu et al. | |
| 2014/0044056 A1* | 2/2014 | Chen | H04W 72/04 370/329 |
| 2014/0198726 A1* | 7/2014 | Xu | H04W 24/02 370/328 |
| 2014/0307621 A1 | 10/2014 | Frenger et al. | |

(Continued)

FOREIGN PATENT DOCUMENTS

| | | |
|---|---|---|
| WO | 2011129643 A2 | 10/2011 |
| WO | 2012087009 A2 | 6/2012 |

OTHER PUBLICATIONS

3GPP TR 36.888, "Technical Specification Group Radio Access Network; Study on provision of low-cost Machine-Type Communications (MTC) User Equipments (UEs) based on LTE (Release 12)", Jun. 2013, 55 pages.

(Continued)

*Primary Examiner* — Redentor Pasia
(74) *Attorney, Agent, or Firm* — Stoel Rives LLP

(57) ABSTRACT

Systems and methods provide coordination between a 3GPP node and user equipment (UE) for coverage enhancement modes (CEM). At predetermined reference times, the node enters CEM and broadcasts dynamic CEM scheduling information. A UE with CEM capability may attempt to connect to the node at the predetermined reference times and other times indicated in the dynamic CEM scheduling information.

24 Claims, 6 Drawing Sheets

(56) References Cited

U.S. PATENT DOCUMENTS

| | | | |
|---|---|---|---|
| 2015/0017977 A1* | 1/2015 | Ratasuk | H04W 88/10 |
| | | | 455/426.1 |
| 2015/0085717 A1* | 3/2015 | Papasakellariou | H04L 5/14 |
| | | | 370/280 |
| 2015/0085795 A1* | 3/2015 | Papasakellariou | H04L 5/006 |
| | | | 370/329 |
| 2015/0117410 A1* | 4/2015 | Wu | H04L 1/08 |
| | | | 370/331 |
| 2015/0181575 A1* | 6/2015 | Ng | H04L 5/0092 |
| | | | 370/329 |
| 2015/0257173 A1* | 9/2015 | You | H04J 11/00 |
| | | | 370/330 |
| 2015/0373740 A1* | 12/2015 | Eriksson | H04W 74/0833 |
| | | | 370/329 |

OTHER PUBLICATIONS

Nokia Siemens Networks, Nokia, "Conclusions from Coverage Enhancement Study for MTC", R1-132299, 3GPP TSG RAN1#73, Fukuoka, Japan, May 20-24, 2013, 4 pages.

PCT/US2015/015341, International Search Report and Written Opinion, May 22, 2015, 10 pages.

* cited by examiner

EFFICIENT COORDINATION BETWEEN A 3GPP NODE AND MTC DEVICES FOR COVERAGE ENHANCEMENT MODE

RELATED APPLICATIONS

This application claims the benefit under 35 U.S.C. §119 (e) of U.S. Provisional Application No. 61/953,646, filed Mar. 14, 2014, which is hereby incorporated by reference herein in its entirety.

TECHNICAL FIELD

This disclosure relates generally to wireless communication networks. Specifically, this disclosure relates to systems and methods for coordinating system information messages and other messages between a network node and a coverage-challenged user equipment (UE) in a coverage enhancement mode.

BACKGROUND INFORMATION

Machine type communication (MTC), also called machine to machine (M2M) communication, is of interest to mobile network operators, equipment vendors, MTC specialist companies, and research bodies. M2M communications enable M2M components to be interconnected, networked, and controlled remotely with low-cost scalable and reliable technologies. Such M2M communications could be carried over mobile networks, in which case the role of mobile network is largely confined to serve as a transport network.

A user equipment device (or simply, UE) used as an MTC device for MTC communications in MTC applications (or simply, MTC) has characteristics such as being nomadically (re-)deployed, having low mobility while deployed, being deployed in locations with low signal strength (e.g., in "poor coverage areas"), proving low priority communications, and infrequently sending small amount of mobile originated (MO) or mobile terminated (MT) data. For example, a smart meter for utility metering applications is a type of UE used as an MTC device (referred to generally as a UE). Such metering devices could monitor municipal utility service usage to periodically report information on energy consumption to service providers. Metering devices may autonomously push reports of usage information to a centralized node in a network, or the centralized node may poll metering devices as reporting information is needed.

Road security is another example application of monitoring. For instance, in the event of a car accident, an in-vehicle emergency call service would autonomously report location information of the car accident to an emergency first responder and thereby facilitate prompt assistance. Other road-security applications for monitoring include intelligent traffic management, automatic ticketing, fleet management, and other uses.

Consumer electronics, including devices such as eBook readers, digital cameras, personal computers, and navigation systems, could also benefit from monitoring. For example, such devices could use monitoring to upgrade firmware or to upload and download online content.

DETAILED DESCRIPTION OF PREFERRED EMBODIMENTS

Figure 1:
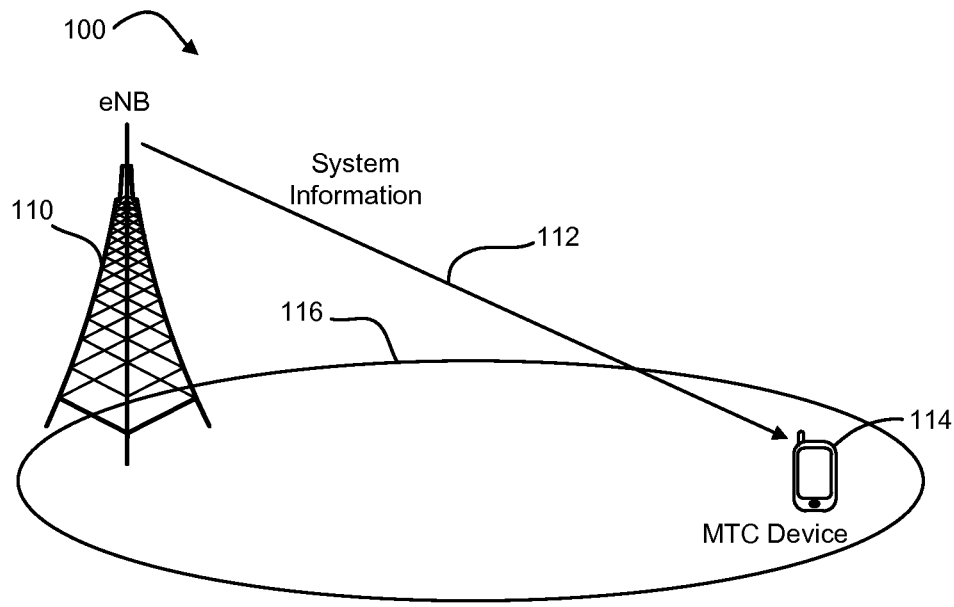
FIG. 1 is a block diagram of a communication network configured to coordinate a coverage enhancement mode (CEM) according to certain embodiments.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

There is an effort to improve the performance of certain MTC devices and other coverage-challenged wireless communication devices. For example, the third generation partnership project (3GPP) standards body is working to provide coverage enhancements of up to about 20 dB in both uplink (UL) and downlink (DL) to enable low-cost MTC devices and other user equipment (UE) to connect to 3GPP long term evolution (LTE) systems.

To enable enhancement in the coverage for such UEs, a node in a 3GPP LTE system may operate in a coverage enhancement mode (CEM) that provides added functionalities such as increased transmission power and/or increased signal repetition for physical downlink control channel (PDCCH) and system information messages sent over the physical downlink shared channel (PDSCH). However, such CEM-enabled nodes lack coordination with UEs for triggering or entering the CEM. Because the CEM is very resource intensive and limits the bandwidth for other UEs (e.g., UEs that are not coverage-challenged), the node generally operates in the enhanced coverage mode only for limited periods of time. If, however, a UE has limited coverage capability and is unable to receive system information messages and/or determine basic information such as the particular frequency bands of a given LTE cell, then the UE does not know when the node will be operating in the CEM.

Thus, without coordination, coverage-challenged UEs (e.g., MTC and other devices) blindly try to connect to the node without any information on whether the node is in coverage enhanced mode or not. Accordingly, coverage-challenged UEs tend to waste energy and may deplete their batteries trying to connect to the node when there is little or no probability of success (as the node is not in CEM at that time).

In certain embodiments disclosed herein, a node in a 3GPP LTE system and the devices in its coverage area may coordinate with each other regarding timing of CEM periods. The embodiments allow the node to have flexibility in determining when to be in coverage enhancement mode and allows the devices to have access to information that may significantly reduce their unsuccessful connection attempts. The embodiments also reduce the unnecessary waste of energy by such UEs in their attempts to determine when to connect to the node (e.g., whether the node is in CEM or not), and in their attempts to connect to the node when the node is not in the CEM mode.

In a 3GPP radio access network (RAN) LTE system, a node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with a wireless device, known as a user equipment (UE). The DL transmission may be a communication from the node (e.g., eNB) to the wireless device (e.g., UE), and the UL transmission may be a communication from the wireless device to the node. As used herein, the terms "node" and "cell" are both intended to be synonymous and refer to a wireless transmission point operable to communicate with multiple user equipment, such as an eNB, a low power node, or other base station.

FIG. 1 is a block diagram of a communication network 100 configured to coordinate an enhanced coverage mode between a node (eNB 110) and a UE (MTC device 114) according to certain embodiments. While the UE in this example is an MTC device, the example may apply to any device experiencing poor coverage, such as a UE located at an edge of a coverage area 116 of the eNB 110 or any device that may benefit from coverage enhancement features (e.g., extensive signaling repetition).

The eNB 110 broadcasts system information 112 that UEs may use to enable access the network 100 and to operate properly within the network 100 and within the coverage area 116. The system information 112 may, for example, be broadcast repeatedly by the eNB 110 and may include, among other things, information about the downlink and uplink cell bandwidths, the uplink/downlink configuration in the case of time-division duplexing (TDD), detailed parameters related to random-access transmissions and uplink power control. The system information 112 may further include so-called "cell barring information" regarding whether a cell may be accessed or not. In a coverage enhancement mode (CEM), the eNB 110 may increase the rate at which it broadcasts the system information 112 (e.g., by two or three times or more) so as to increase the ability of the MTC device 114 to receive and decode the signal. At least during certain fixed or predetermined CEM periods, the system information 112 also includes dynamic CEM scheduling information indicating defining additional CEM periods. In other embodiments, the system information 112 always includes the dynamic scheduling information.

Using fixed (i.e., predetermined) CEM periods and dynamically scheduled CEM periods, allows the eNB 110 flexibility to increase or decrease the frequency and duration of CEM periods based on changes in load and/or other system constraints, while still allowing UEs that need coverage enhancement (e.g., the MTC device 114) a reference indicating when the CEM is scheduled so that the UEs do not needlessly waste energy looking for the CEM (e.g., when the CEM is not scheduled for a long time).

In certain embodiments, the network 100 uses a two-tier approach including predetermined fixed instances of time for each of the LTE frequency bands that are known before the MTC device 114 is deployed in the network 100 when the MTC device 114 can expect to receive the system information 112 from the eNB 110 in CEM. The fixed instances, or predetermined reference times, correspond to the start of respective CEM predetermined periods that may be brief (e.g., a few seconds) to allow the eNB 110 scheduling flexibility. The predetermined CEM periods, however, may be long enough such that the MTC device 114 is able to receive the system information 112 at least once during CEM. In certain embodiments, the predetermined CEM periods are long enough so that the system information 112 may be repeated three or four times, or more.

During the fixed or predetermined CEM periods, the eNB 110 is configured to broadcast information (e.g., dynamic CEM scheduling information) indicating when the eNB 110 will provide CEM transmissions for the time between successive predetermined CEM periods. The dynamic CEM periods may be scheduled periodically or at random intervals and may be longer than the predetermined CEM periods. For example, the dynamic CEM periods according to certain embodiments are on the order of minutes and/or hours.

In certain embodiments, information corresponding to the predetermined CEM periods, including the time durations and/or the predetermined reference times at which the CEM periods begin, are hardcoded in CEM-equipped UEs, such as the MTC device 114 shown in FIG. 1. In addition, or in other embodiments, the CEM-equipped UEs may be initially configured when deployed and/or reconfigured at other times with the information corresponding to the CEM periods. Thus, during the predetermined CEM periods, the MTC device 114 and other CEM-equipped UEs are able to determine that the eNB 110 is configured to briefly be in CEM such that the broadcasted system information 112 including the dynamic CEM scheduling information may be received and decoded.

By knowing the dynamic CEM scheduling information, the MTC device 114 and other coverage-challenged UEs may only attempt, according to certain embodiments, to connect to the eNB 110 when the eNB 110 is expected to be in CEM according to the broadcast schedule. Such embodiments strike a balance between a totally static schedule for CEM and a totally dynamic schedule for CEM.

By fixing specific times when the dynamic CEM scheduling information will be available, the MTC device 114 and other UEs that may CEM are more likely to access to the network 100, while at the same time providing scheduling flexibility to the eNB 110. For example, if the eNB 110 finds itself heavily loaded, the eNB 110 can schedule fewer instances of CEM, or vice versa.

Figure 2:
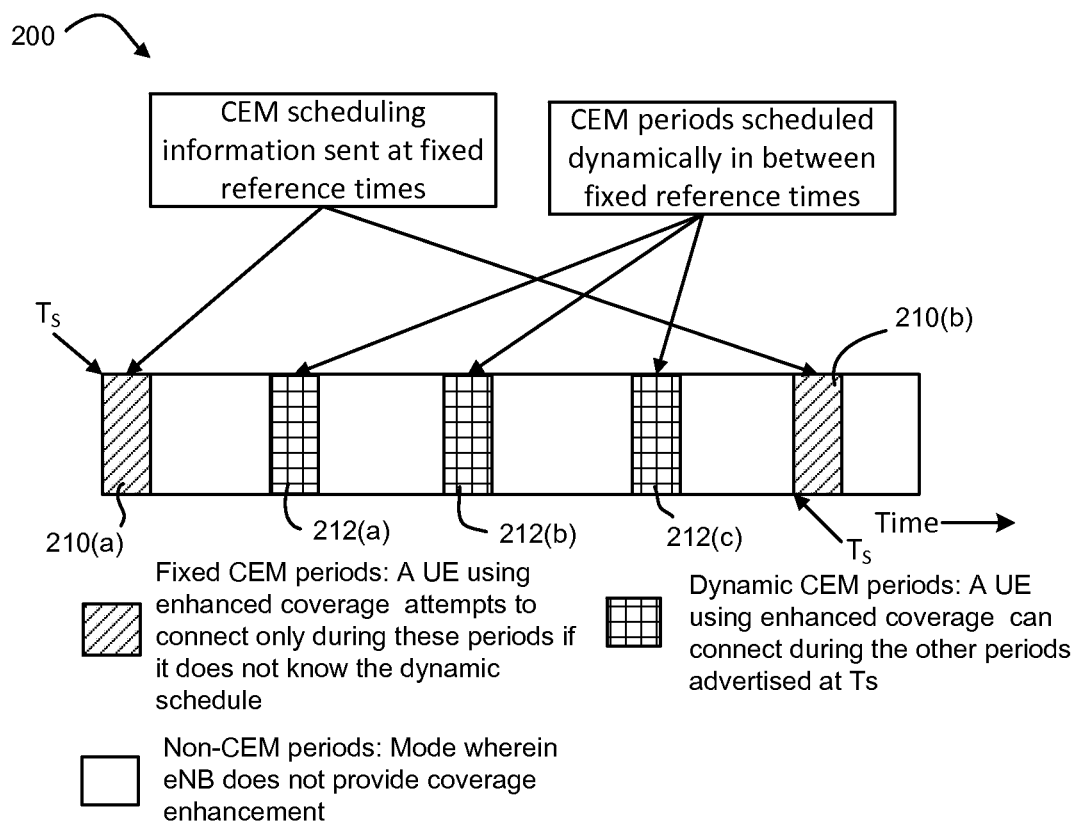
FIG. 2 illustrates an example timing diagram of fixed or predetermined CEM periods and dynamically scheduled CEM periods according to one embodiment.

FIG. 2 illustrates an example timing diagram 200 of fixed or predetermined CEM periods and dynamically scheduled CEM periods according to one embodiment. In this example, a first predetermined CEM period 210(a) and a second predetermined CEM period 210(b) start at respective occurrences of specific time instances or predetermined reference times Ts. One or more dynamically scheduled CEM periods occur between the first predetermined CEM period 210(a) and the second predetermined CEM period 210(b). As shown in FIG. 2, this example includes a first dynamic CEM period 212(a), a second dynamic CEM period 212(b), and a third dynamic CEM period 212(c). Those skilled in the art will recognize from the disclosure herein, however, that fewer (including only one) dynamically scheduled CEM periods or many more dynamically scheduled CEM periods may be used.

For each LTE frequency band, the predetermined reference times Ts define when an eNB starts to broadcast information about the CEM schedules between the first predetermined CEM period 210(a) and the second predetermined CEM period 210(b). In other words, the eNB transmits dynamic CEM scheduling information during the first predetermined CEM period 210(a) and the second predetermined CEM period 210(b) to indicate the start and/or duration of the first dynamic CEM period 212(a), the second dynamic CEM period 212(b), and the third dynamic CEM period 212(c). The schedules in the broadcast dynamic CEM scheduling information may be in a compressed format (e.g., the schedules can be expressed in terms of period and duration).

In certain embodiments, the predetermined reference times Ts are periodic and the intervals between successive predetermined reference times Ts can be hardcoded or otherwise configured in the CEM-equipped UEs. The intervals between successive predetermined reference times Ts, according to certain embodiments, are on a large time scale (e.g., in the order of hours and/or minutes).

At the onset of each predetermined reference time Ts, the eNB is configured to enter CEM and to remain in CEM for a defined duration or period of time (e.g., a few seconds). The defined duration or period may also be hardcoded or otherwise configured in the CEM-equipped UEs. During this period (i.e., during the first predetermined CEM period 210(a)), the eNB is configured to use a system information message to broadcast the dynamic CEM scheduling information. For example, in certain embodiments, the eNB broadcasts the dynamic CEM scheduling information in the system information block (SIB)1 or any other SIB currently defined or later created.

The duration of each of the first predetermined CEM period 210(a) and the second predetermined CEM period 210(b), although brief, may be determined such that a UE in enhanced coverage mode is able to receive the entire system information required for it to be able to connect to the network at least once. Thus, the eNB may repeat the broadcast of the system information a plurality of times during each of the first predetermined CEM period 210(a) and the second predetermined CEM period 210(b) to allow for UEs waking up slightly later than the predetermined reference times Ts to access the network. Repeating the broadcast of the system information a plurality of times during each of the first predetermined CEM period 210(a) and the second predetermined CEM period 210(b) also accounts for clock drift between the eNB and the UEs.

UEs configured for coverage enhancement mode may be configured to receive and decode the broadcasted dynamic CEM scheduling information at the predetermined reference times Ts so as to coordinate coverage enhancement with CEM-capable eNBs. If a coverage-challenged UE is in sleep or dormant mode, it may wake up to receive the system information with the dynamic CEM scheduling information at the next known Ts time instance. The coverage-challenged UEs that are already connected at the beginning of a predetermined reference times Ts may use the broadcasted dynamic CEM scheduling information to update an internally stored version of the upcoming CEM mode schedule.

In certain embodiments, MTC devices and other coverage-challenged UEs only attempt to connect to the network during scheduled times for CEM. For example, the UEs may be configured to only connect to the eNB during the first predetermined CEM period 210(a), the second predetermined CEM period 210(b), the first dynamic CEM period 212(a), the second dynamic CEM period 212(b), and/or the third dynamic CEM period 212(c). In other embodiments, a UE (including an MTC device) may attempt to connect to the network during a non-CEM mode.

Figure 3:
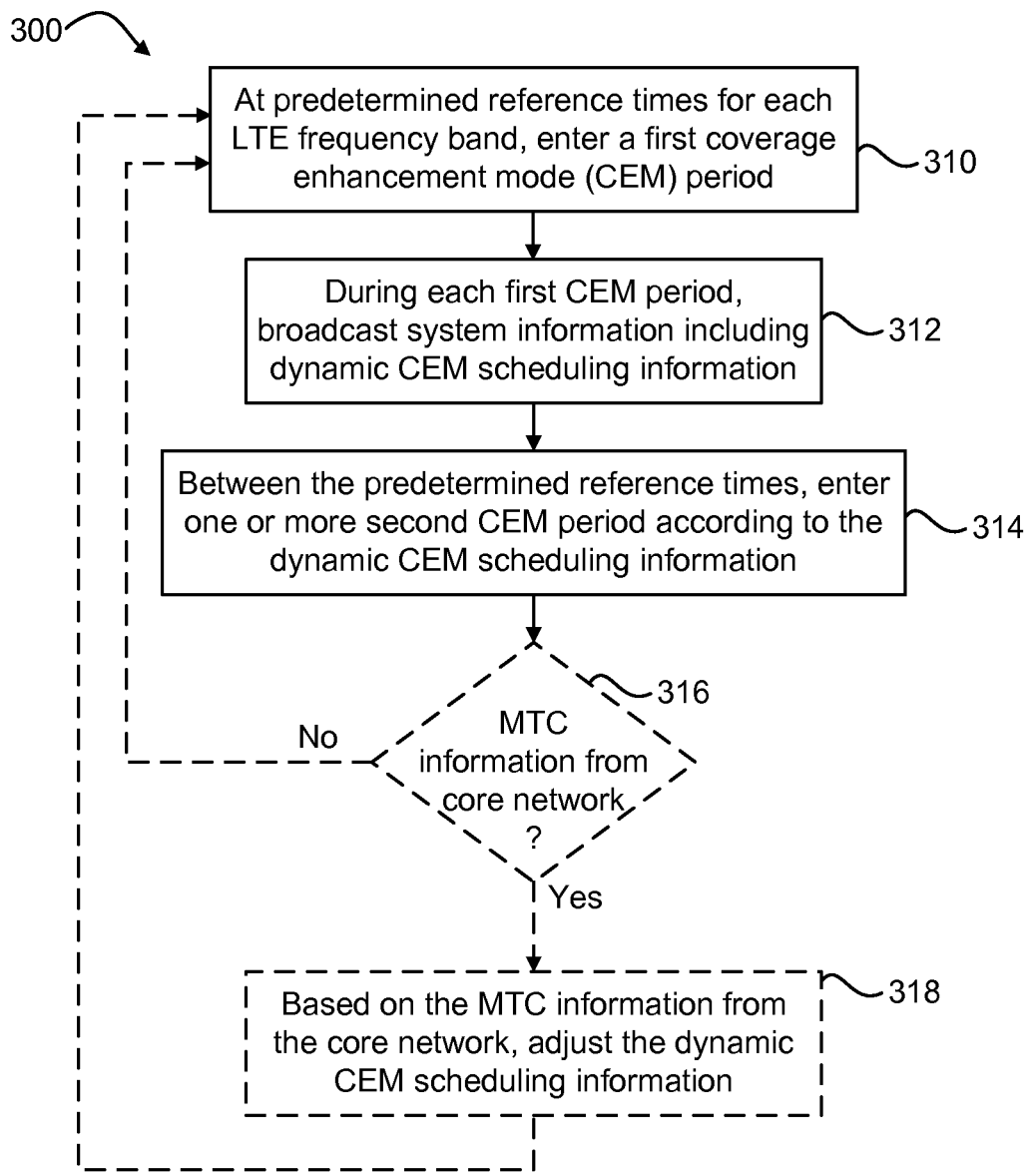
FIG. 3 is a flow chart of a method for coverage enhancement mode coordination according to one embodiment.

FIG. 3 is a flow chart of a method 300 for coverage enhancement mode coordination according to one embodiment. The method 300 may be performed, for example, by an eNB. The method 300 includes, at predetermined reference times for each LTE frequency band, entering 310 a first coverage enhancement mode (CEM) period. During each first CEM periods, an eNB broadcasts 312 system information including dynamic CEM scheduling information. Between the predetermined reference times, the method 300 includes entering 314 one or more second CEM period according to the dynamic CEM scheduling information.

In addition, or in other embodiments, the method 300 may further include querying 316 whether MTC information has been received from the core network. For example, a mobility management entity (MME) or other network entity may provide MTC information to coordinate scheduled reporting intervals of one or more smart metering devices within a cell with the scheduling of coverage enhancement modes. If MTC information has been received from the core network, the method 300 further includes adjusting 318, based on the MTC information from the core network, the dynamic CEM scheduling information (e.g., to occur at a different rate and/or for different duration). The method 300 repeats with the new dynamic scheduling information. If, however, MTC information has not been received from the core network, the method 300 may repeat with the previous dynamic CEM scheduling information. As discussed above, even if MTC information is not received from the core network, the eNB in certain embodiments may change the dynamic CEM scheduling information based on a current load and/or other system constraints.

Figure 4:
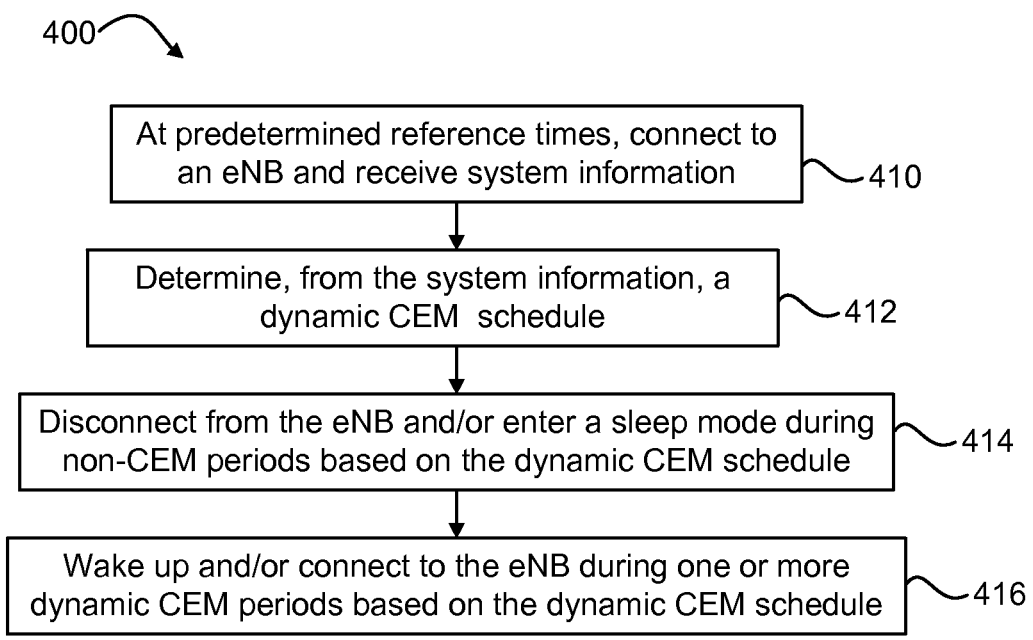
FIG. 4 is a flowchart of a method for coverage enhancement coordination according to another embodiment.

FIG. 4 is a flowchart of a method 400 for coverage enhancement coordination according to another embodiment. The method 400 may be performed, for example, by a UE. The method 400 includes, at predetermined reference times, connecting 410 the UE to an eNB and receiving system information. The UE then determines 412, from the system information, a dynamic CEM schedule. The method 400 further includes disconnecting 414 the UE from the eNB and/or entering a sleep mode during non-CEM periods based on the dynamic CEM schedule. The method 400 also includes waking up 416 and/or connecting to the eNB during one or more dynamic CEM periods based on the dynamic CEM schedule.

Figure 5:
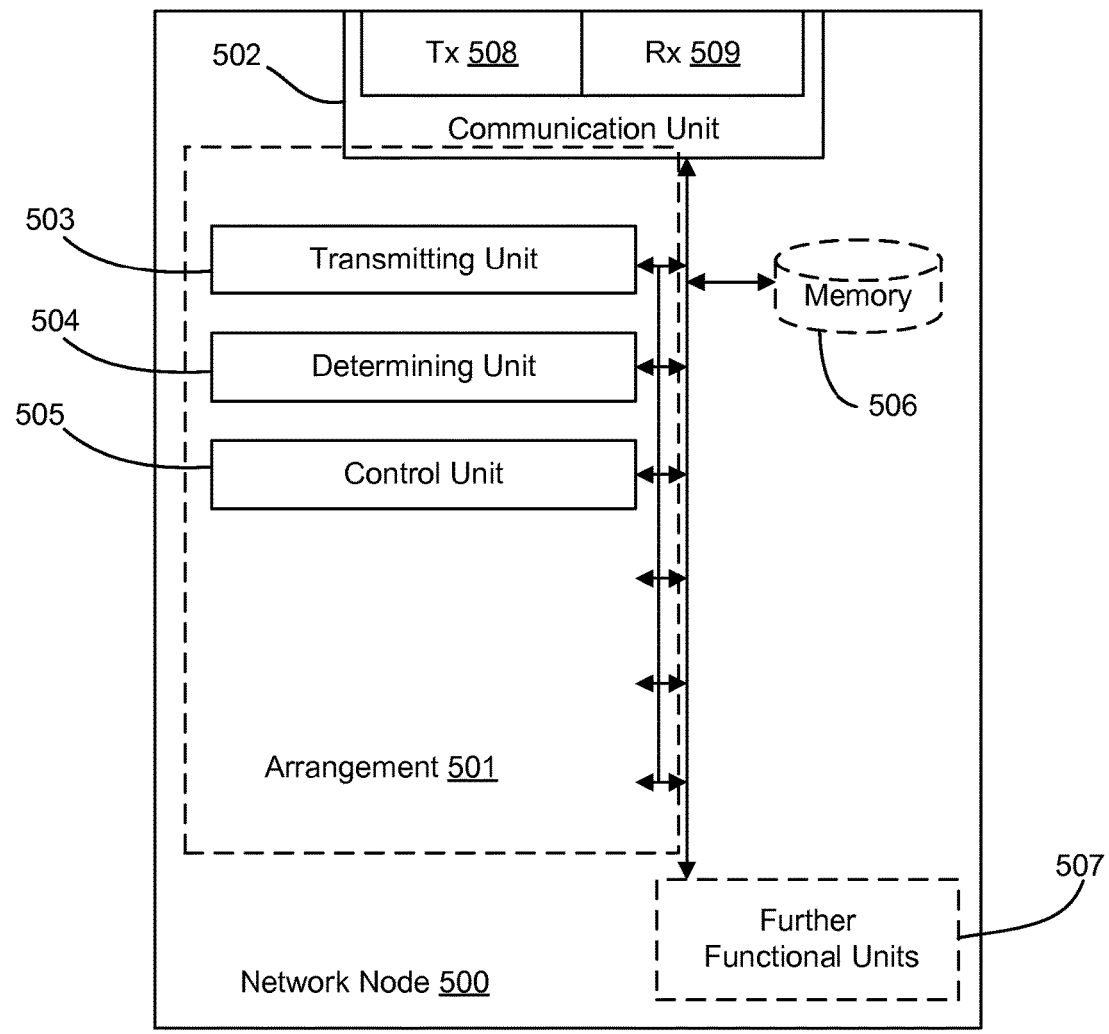
FIG. 5 is a block diagram of an example network node according to one embodiment.

FIG. 5 is a block diagram of an example network node 500 according to one embodiment. The network node 500 may comprise, for example, an eNB adapted to enable the performance of the above described methods in a network. The network node 500 supports a coverage enhancement mode, as described above. The network node 500 includes an arrangement 501, which is shown surrounded by a dashed line. The network node 500 may be a base station such as an eNB in an LTE communication system. The network node 500 and arrangement 501 is further illustrated as to communicate with other entities via a communication unit 502, which may be regarded as part of the arrangement 501. The communication unit 502 comprises means for communication, such as a receiver (Rx) 509 and a transmitter (Tx) 508, or a transceiver. The communication unit 502 may alternatively be denoted "interface". The arrangement or network node may further comprise other functional units 507, such as functional units providing regular eNB functions, and may further comprise one or more memory units 506.

The arrangement 501 may be implemented, for example, by one or more of: a processor or a micro processor and adequate software and memory for storing thereof, a programmable logic device (PLD) or other electronic component(s) or processing circuitry configured to perform the actions described herein.

The arrangement part of the network node comprises a transmitting unit 503, adapted to transmit system information to one or more UEs, said system information comprising dynamic CEM scheduling information. The arrangement part of the network node further comprises a control unit 505 adapted to enter a first CEM mode at predetermined reference times and a second CEM mode at dynamically scheduled times. A determining unit 504, or some other unit in the arrangement, is adapted to determine the dynamic CEM scheduling information.

Figure 6:
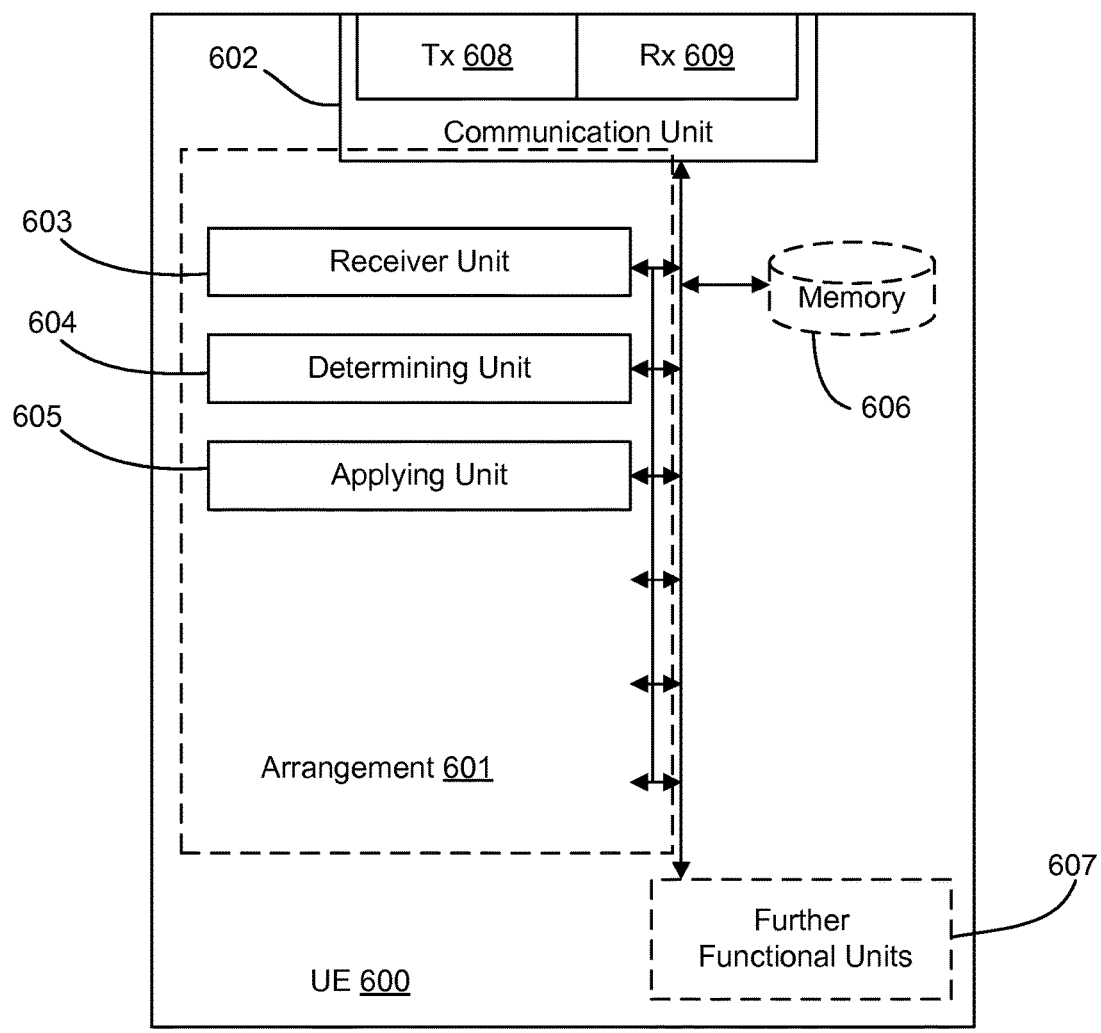
FIG. 6 is a block diagram of an example UE according to one embodiment.

FIG. 6 is a block diagram of an example UE 600 according to one embodiment. Embodiments described herein relate to the UE 600 operable in a wireless communication system. The UE 600 is adapted to perform at least one embodiment of the embodiments described above. The UE 600 is associated with the same technical features, objects and advantages as the method, performed by a UE, described above. The network node will be described in brief in order to avoid unnecessary repetition. The UE 600 supports an coverage enhancement mode, as described above.

The UE 600 includes an arrangement 601, which is shown surrounded by a dashed line. The UE 600 may be an MTC device or other device configured to communicate through an LTE communication system. The UE 600 and arrangement 601 is further illustrated as to communicate with other entities via a communication unit 602, which may be regarded as part of the arrangement 601. The communication unit 602 comprises means for communication, such as a receiver (Rx) 609 and a transmitter (Tx) 608, or a transceiver. The communication unit 602 may alternatively be denoted "interface". The arrangement or UE may further comprise other functional units 607, such as functional units providing regular UE functions, and may further comprise one or more memory units 606.

The arrangement 601 may be implemented, for example, by one or more of: a processor or a micro processor and adequate software and memory for storing thereof, a PLD or other electronic component(s) or processing circuitry configured to perform the actions described herein.

The arrangement 601 comprises a receiver unit 603, adapted to receive system information from a network node, said system information comprising dynamic CEM scheduling information. The arrangement 601 further comprise a determining unit 604, which could alternatively be denoted "selecting unit" and/or "identifying unit". The determining unit may be adapted to determine, from the system information, a dynamic CEM schedule. The arrangement 601 further comprises an applying unit 605, adapted to apply the dynamic CEM schedule, as described herein.

Figure 7:
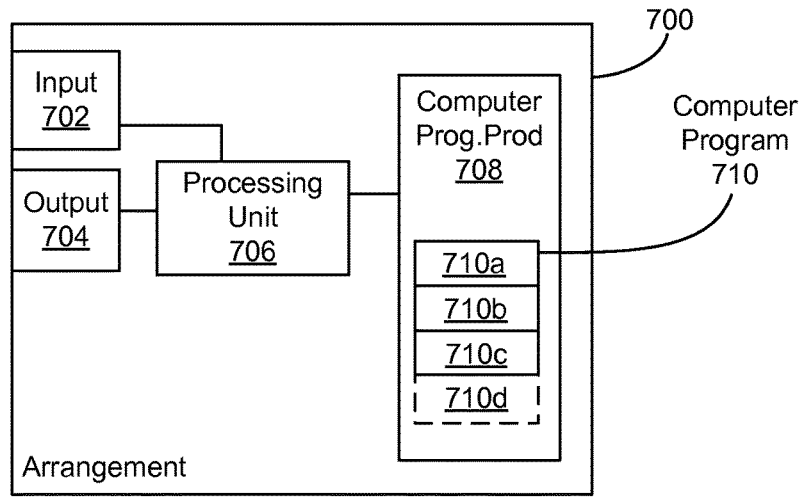
FIG. 7 is a block diagram of an arrangement according to one embodiment.

FIG. 7 is a block diagram of an arrangement 700 according to one embodiment. The illustrated arrangement 700 may be an alternative way of disclosing an embodiment of the arrangement 501 or 601 illustrated in any of FIG. 5 or 6. Comprised in the arrangement 700 are a processing unit 706, e.g., with a DSP (digital signal processor). The processing unit 706 may be a single unit or a plurality of units to perform different actions of procedures described herein. The arrangement 700 may also comprise an input unit 702 for receiving signals from other entities, and an output unit 704 for providing signal(s) to other entities. The input unit 702 and the output unit 704 may be arranged as an integrated entity.

Furthermore, the arrangement 700 may comprise at least one computer program product 708 in the form of a non-volatile or volatile memory, e.g., an EEPROM (electrically erasable programmable read-only memory), a flash memory and/or a hard drive. The computer program product 708 may comprise a computer program 710, which comprises code means, which when executed in the processing unit 706 in the arrangement 700 causes the arrangement and/or a node in which the arrangement is comprised to perform the actions described herein.

The computer program 710 may be configured as a computer program code structured in computer program modules. Hence, in an example embodiment for use in a network node, the code means in the computer program 710 of the arrangement 700 comprises a transmitter module 710a for transmitting system information. The computer program 710 may further comprise a determining module 710b, for determining dynamic CEM scheduling information. The computer program 710 further comprises a selecting module 710c and additional computer program modules 710d, adapted to provide some or all of the different actions of the embodiments described above in conjunction with the procedure in a network node.

A corresponding arrangement in a UE could be described in a similar manner, with the necessary changes made, which changes may be derived from other parts of this document.

Although the code means in the embodiment disclosed above in conjunction with FIG. 7 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (central processing unit), but could also comprise two or more processing units. For example, the processor may include general purpose microprocessors; instruction set processors and/or related chips sets and/or special purpose microprocessors such as ASICs (application specific integrated circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (random-access memory) ROM (read-only memory) or an EEPROM, and the computer program modules described above could in alternative embodiments be distributed on different computer program products in the form of memories within the network node or within the UE.

Figure 8:
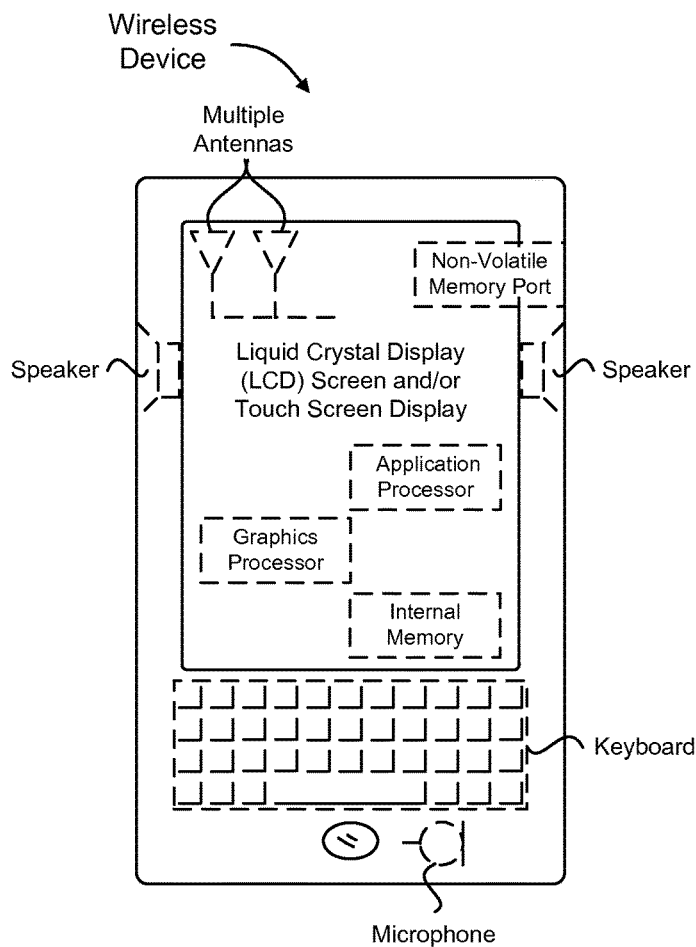
FIG. 8 is an example illustration of a mobile device according to certain embodiments.

FIG. 8 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 8 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Certain embodiments disclosed herein provide predetermined fixed reference instances of time when a CEM-capable eNB is in CEM such that a UE requiring enhanced coverage can connect to the eNB during these fixed time references. During the fixed references of CEM, the eNB broadcasts information regarding the scheduling of any further dynamic instances of CEM between the current and the next fixed reference CEM instance. In certain such embodiments, the scheduling information for further CEM instances is broadcast in system information messages and may be included, for example, in SIB1 or any other existing or newly proposed SIB. The information broadcast in the SIB1 regarding dynamic scheduling of CEM may be in terms of periodicity (e.g., minutes) and duration of each dynamic CEM instance, or be very specific in terms of system frame number (SFN) and duration. The information in the SIB1 may depend on the frequency of CEM instances while still maintaining a quality of service (QoS) for other UEs not using the CEM.

Additional Example Embodiments

The following are examples of further embodiments:

Example 1 is a network node that includes a transmitting unit and a controller. The transmitting unit transmits system information to one or more wireless devices in a LTE network. The controller enters, at a plurality of predetermined reference times for each LTE frequency band, first CEM periods. During each of the first CEM periods, the controller broadcasts dynamic CEM scheduling information in the system information. Between the plurality of predetermined reference times, the controller enters one or more second CEM periods according to the dynamic CEM scheduling information.

In Example 2, the controller of Example 1 is further configured to increase a repetition rate of the system information during each of the first CEM periods and the one or more second CEM periods.

In Example 3, the controller of any of Examples 1-2 is further configured to adjust the dynamic CEM scheduling information based on changes in load or system constraints.

In Example 4, the controller of any of Examples 1-3 is further configured to broadcast the adjusted dynamic CEM scheduling information in subsequent occurrences of the first CEM periods.

In Example 5, each of the first CEM periods in any of Examples 1-4 includes a predetermined time duration, and the controller is configured to select variable time durations for the one or more second CEM periods according to the dynamic CEM scheduling information.

In Example 6, the predetermined time duration in any of Examples 1-5 is less than the variable time durations.

In Example 7, the plurality of predetermined reference times in any of Examples 1-6 repeat periodically.

In Example 8, the controller of any of Examples 1-7 is further configured to receive MTC information from a core network. The MTC information corresponds to a configuration or parameters of at least one MTC device in a coverage area of the network node. The controller is further configured to, based on the MTC information from the core network, adjust the dynamic CEM scheduling information.

Example 9 is a UE that includes a wireless transceiver that communicates with an eNB and circuitry to connect, during a first fixed period, to the eNB and receive system information through the wireless transceiver. The circuitry is configured to determine, from the system information, a first set of variable periods corresponding to an increased capability to connect to the eNB. The circuitry is configured to disconnect from the eNB after receiving the system information in the first fixed period. The circuitry is configured to reconnect to the eNB during one or more of the first set of variable periods.

In Example 10, the circuitry in Example 9 is further configured to enter a sleep mode after the first fixed period and between the first set of variable periods, and wake up from the sleep mode to reconnect to the eNB during one or more of the first set of variable periods.

In Example 11, the circuitry in any of Examples 9-10 is further configured to connect, during a second fixed period, to the eNB and receive system information comprising a second set of variable periods corresponding to increased capability to connect to the eNB. The circuitry is further configured to connect to the eNB during one or more of the second set of variable periods.

In Example 12, at least one of a duration and a repetition rate in any of Examples 9-11 is different in the second set of variable periods and the first set of variable periods.

In Example 13, the first fixed period in any of Examples 9-12 is hardcoded into the circuitry.

In Example 14, the UE of any of Examples 9-12 further includes a memory device to store the first fixed period.

In Example 15, the UE of any of Examples 9-14 is configured as a MTC device.

In Example 16, the first fixed period and the first set of variable periods in any of Examples 9-15 includes CEM periods.

Example 17 is a method that includes transmitting, from a network node, system information to one or more wireless devices in a LTE network. The method includes, at a plurality of predetermined reference times for each LTE frequency band, entering first coverage enhancement mode (CEM) periods. The method includes, during each of the first CEM periods, broadcasting dynamic CEM scheduling information in the system information. The method includes, between the plurality of predetermined reference times, entering one or more second CEM periods according to the dynamic CEM scheduling information.

Example 18 includes the subject matter of Example 17, and further includes increasing a repetition rate of the system information during each of the first CEM periods and the one or more second CEM periods.

Example 19 includes the subject matter of any of Examples 17-18, and further includes adjusting the dynamic CEM scheduling information based on changes in load or system constraints.

Example 20 includes the subject matter of any of Examples 17-19, and further includes broadcasting the adjusted dynamic CEM scheduling information in subsequent occurrences of the first CEM periods.

Example 21 includes the subject matter of any of Examples 17-20, wherein each of the first CEM periods comprises a predetermined time duration, and wherein the method further comprises selecting variable time durations for the one or more second CEM periods according to the dynamic CEM scheduling information.

Example 22 includes the subject matter of any of Examples 17-21, wherein the predetermined time duration is less than the variable time durations.

Example 23 includes the subject matter of any of Examples 17-22, wherein the plurality of predetermined reference times repeat periodically.

Example 24 includes the subject matter of any of Examples 17-23, and further includes: receiving machine type communication (MTC) information from a core network, the MTC information corresponding to a configuration or parameters of at least one MTC device in a coverage area of the network node; and based on the MTC information from the core network, adjusting the dynamic CEM scheduling information.

Example 25 is a method comprising: during a first fixed period, connecting, at a user equipment (UE), to an Evolved Universal Terrestrial Radio Access Network (E-UTRAN) Node B (eNB) and receive system information through a wireless transceiver; determining, from the system information, a first set of variable periods corresponding to an increased capability to connect to the eNB; disconnecting from the eNB after receiving the system information in the first fixed period; and reconnecting to the eNB during one or more of the first set of variable periods.

Example 26 includes the subject matter of Example 25, and further includes entering a sleep mode after the first fixed period and between the first set of variable periods, and waking up from the sleep mode to reconnect to the eNB during one or more of the first set of variable periods.

Example 27 includes the subject matter of any of Examples 25-26, and further includes: during a second fixed period, connecting to the eNB and receive system information comprising a second set of variable periods corresponding to increased capability to connect to the eNB; and connecting to the eNB during one or more of the second set of variable periods.

Example 28 includes the subject matter of any of Examples 25-27, wherein at least one of a duration and a repetition rate is different in the second set of variable periods and the first set of variable periods.

Example 29 includes the subject matter of any of Examples 25-28, and further includes hardcoding the first fixed period into circuitry of the UE.

Example 30 includes the subject matter of any of Examples 25-28, and further includes storing the first fixed period in a memory device of the UE.

Example 31 is an apparatus comprising means to perform a method as claimed in any of Examples 17-30.

Example 32 is a machine readable storage including machine-readable instructions to implement a method or realize an apparatus as claimed in any of Examples 17-30.

Example 33 is an apparatus comprising processing logic configured to perform a method as claimed in any of Examples 17-30.

Various techniques disclosed herein, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more modules or components, which are terms used to more particularly emphasize their implementation independence. For example, a module or component may be implemented as a hardware circuit comprising custom very large scale integration (VLSI) circuits or gate arrays, off-the-shelf semiconductors such as logic chips, transistors, or other discrete components. A module or component may also be implemented in programmable hardware devices such as field programmable gate arrays, programmable array logic, programmable logic devices, or the like.

Modules or components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified module or component need not be physically located together, but may comprise disparate instructions stored in different locations that, when joined logically together, comprise the module or component and achieve the stated purpose for the module or component.

Indeed, a module or component of executable code may be a single instruction, or many instructions, and may even be distributed over several different code segments, among different programs, and across several memory devices. Similarly, operational data may be identified and illustrated herein within modules or components, and may be embodied in any suitable form and organized within any suitable type of data structure. The operational data may be collected as a single data set, or may be distributed over different locations including over different storage devices, and may exist, at least partially, merely as electronic signals on a system or network. The modules or components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

It will be understood by those having skill in the art that many changes may be made to the details of the above-described embodiments without departing from the underlying principles of the invention. The scope of the present invention should, therefore, be determined only by the following claims.

The invention claimed is:

1. A network node comprising:
a transmitting unit to transmit system information to one or more wireless devices in a long term evolution (LTE) network;
a controller to:
at a plurality of predetermined reference times for each LTE frequency band, enter first coverage enhancement mode (CEM) periods;
during each of the first CEM periods, broadcast dynamic CEM scheduling information in the system information; and
between the plurality of predetermined reference times, enter one or more second CEM periods according to the dynamic CEM scheduling information,
wherein each of the first CEM periods comprises a predetermined time duration, and wherein the controller is configured to select variable time durations for the one or more second CEM periods according to the dynamic CEM scheduling information.

2. The network node of claim 1, wherein the controller is further configured to increase a repetition rate of the system information during each of the first CEM periods and the one or more second CEM periods.

3. The network node of claim 1, wherein the controller is further configured to adjust the dynamic CEM scheduling information based on changes in load or system constraints.

4. The network node of claim 3, wherein the controller is further configured to broadcast the adjusted dynamic CEM scheduling information in subsequent occurrences of the first CEM periods.

5. The network node of claim 1, wherein the predetermined time duration is less than the variable time durations.

6. The network node of claim 1, wherein the plurality of predetermined reference times repeat periodically.

7. The network node of claim 1, wherein the controller is further configured to:
receive machine type communication (MTC) information from a core network, the MTC information corresponding to a configuration or parameters of at least one MTC device in a coverage area of the network node; and
based on the MTC information from the core network, adjust the dynamic CEM scheduling information.

8. A user equipment (UE) comprising:
a wireless transceiver to communicate with an Evolved Universal Terrestrial Radio Access Network (E-UTRAN) Node B (eNB); and
circuitry to:
during a first fixed period, connect to the eNB and receive system information through the wireless transceiver;
determine, from the system information, a first set of variable periods corresponding to an increased capability to connect to the eNB;
disconnect from the eNB after receiving the system information in the first fixed period;
enter a sleep mode after the first fixed period and between the first set of variable periods; and
wake up from the sleep mode to reconnect to the eNB during one or more of the first set of variable periods.

9. The UE of claim 8, wherein the circuitry is further configured to:
during a second fixed period, connect to the eNB and receive system information comprising a second set of variable periods corresponding to increased capability to connect to the eNB; and
connect to the eNB during one or more of the second set of variable periods.

10. The UE of claim 9, wherein at least one of a duration and a repetition rate is different in the second set of variable periods and the first set of variable periods.

11. The UE of claim 8, wherein the first fixed period is hardcoded into the circuitry.

12. The UE of claim 8, further comprising a memory device to store the first fixed period.

13. The UE of claim 8, wherein the UE is configured as a machine type communication (MTC) device.

14. The UE of claim 8, wherein the first fixed period and the first set of variable periods comprise coverage enhancement mode (CEM) periods.

15. The UE of claim 8, wherein the UE comprises at least one of an antenna, a touch sensitive display screen, a speaker, a microphone, a graphics processor, an application processor, internal memory, a non-volatile memory port, or combinations thereof.

16. A method comprising:
transmitting, from a network node, system information to one or more wireless devices in a long term evolution (LTE) network;
at a plurality of predetermined reference times for each LTE frequency band, entering first coverage enhancement mode (CEM) periods;
during each of the first CEM periods, broadcasting dynamic CEM scheduling information in the system information;
between the plurality of predetermined reference times, entering one or more second CEM periods according to the dynamic CEM scheduling information;
receiving machine type communication (MTC) information from a core network, the MTC information corresponding to a configuration or parameters of at least one MTC device in a coverage area of the network node; and
based on the MTC information from the core network, adjusting the dynamic CEM scheduling information.

17. The method of claim 16, further comprising increasing a repetition rate of the system information during each of the first CEM periods and the one or more second CEM periods.

18. The method of claim 16, further comprising adjusting the dynamic CEM scheduling information based on changes in load or system constraints.

19. The method of claim 18, further comprising broadcasting the adjusted dynamic CEM scheduling information in subsequent occurrences of the first CEM periods.

20. The method of claim 16, wherein each of the first CEM periods comprises a predetermined time duration, and wherein the method further comprises selecting variable time durations for the one or more second CEM periods according to the dynamic CEM scheduling information.

21. The method of claim 20, wherein the predetermined time duration is less than the variable time durations.

22. The method of claim 16, wherein the plurality of predetermined reference times repeat periodically.

23. A user equipment (UE) comprising:
a wireless transceiver to communicate with an Evolved Universal Terrestrial Radio Access Network (E-UTRAN) Node B (eNB); and
circuitry to:
during a first fixed period, connect to the eNB and receive system information through the wireless transceiver;
determine, from the system information, a first set of variable periods corresponding to an increased capability to connect to the eNB;
disconnect from the eNB after receiving the system information in the first fixed period;
reconnect to the eNB during one or more of the first set of variable periods;
during a second fixed period, connect to the eNB and receive system information comprising a second set of variable periods corresponding to increased capability to connect to the eNB; and
connect to the eNB during one or more of the second set of variable periods.

24. The UE of claim 23, wherein at least one of a duration and a repetition rate is different in the second set of variable periods and the first set of variable periods.

* * * * *